United States Patent [19]

Shim

[11] Patent Number: 6,154,261
[45] Date of Patent: Nov. 28, 2000

[54] SUBSTRATE COUPLING STRUCTURE FOR FLAT-PANEL DISPLAY

[75] Inventor: Jae-Soo Shim, Kyungki-do, Rep. of Korea

[73] Assignee: SamSung Electronics Co., Ltd., Suwon, Rep. of Korea

[21] Appl. No.: 08/984,887

[22] Filed: Dec. 4, 1997

[30] Foreign Application Priority Data

Dec. 4, 1996 [KR] Rep. of Korea ...................... 96-45573

[51] Int. Cl.[7] ...................... G02F 1/1333; G02F 1/1335; G02F 1/1345
[52] U.S. Cl. ................... 349/58; 349/60; 349/65; 349/84; 349/151; 362/29; 362/31
[58] Field of Search .................. 349/58–60, 65, 349/151, 150, 84; 362/29, 31

[56] References Cited

U.S. PATENT DOCUMENTS

| | | |
|---|---|---|
| 3,922,051 | 11/1975 | Reynolds . |
| 4,111,533 | 9/1978 | Nakamura . |
| 4,422,728 | 12/1983 | Andreaggi ................................. 349/58 |
| 4,514,920 | 5/1985 | Shafrir et al. .............................. 349/58 |
| 4,903,167 | 2/1990 | Lichtensperger . |
| 4,950,072 | 8/1990 | Honda . |
| 5,134,548 | 7/1992 | Turner . |
| 5,404,274 | 4/1995 | Bond . |
| 5,486,942 | 1/1996 | Ichikawa et al. ......................... 349/58 |
| 5,594,573 | 1/1997 | August . |
| 5,666,172 | 9/1997 | Ida et al. ................................... 349/58 |
| 5,694,190 | 12/1997 | Matsumoto et al. ..................... 349/151 |
| 5,808,707 | 9/1998 | Niibori et al. ............................. 349/60 |
| 5,835,254 | 11/1998 | Bacon ....................................... 349/58 |
| 5,905,550 | 5/1999 | Ohgami et al. ........................... 349/58 |
| 6,034,751 | 3/2000 | Kamiya ..................................... 349/60 |

*Primary Examiner*—William L. Sikes
*Assistant Examiner*—Julie Ngo
*Attorney, Agent, or Firm*—Robert E. Bushnell, Esq.

[57] ABSTRACT

A substrate coupling structure for a flat panel variable visual display monitor may be constructed with a guide rib, formed on the inside surface of a rear monitor cover, having a race for receiving two adjacent edges of a rectangular substrate (PCB); and a plurality of elastic snaps, formed on the rear cover opposite the guide rib, each having a catch for receiving the other two edges of the substrate, thereby enabling the substrate to be securely coupled to the rear cover.

17 Claims, 2 Drawing Sheets

SUBSTRATE COUPLING STRUCTURE FOR FLAT-PANEL DISPLAY

CLAIM OF PRIORITY

This application makes reference to, incorporates the same herein, and claims all benefits accruing under 35 U.S.C. § 119 from an application entitled Substrate Coupling Structure For LCD Monitor earlier filed in the Korean Industrial Property Office on Dec. 4, 1996, and there duly assigned Serial No. 96-45573 by that Office.

BACKGROUND OF THE INVENTION

1. Field of the Invention

The present invention relates to a liquid crystal display (LCD) monitor. More particularly, the present invention relates to an improved structure and method for assembling a substrate (e.g., a printed circuit board) with liquid crystal display (LCD) monitor, using a guide rib and snaps, to simplify monitor fabrication.

2. Discussion of Related Art

A liquid crystal display (LCD) monitor includes a printed circuit board which typically is mounted across a majority of the inner surface of the monitor.

U.S. Pat. No. 4,903,167, to Lichtensperger, entitled Casing for Accommodating Electrical and/or Electronic Components, includes a box with a groove or stop receiving the edge of a printed circuit board. The board is pivoted about the groove or stop until the other end deforms and advances beyond a snap nose, whereupon the snap nose regains its design position and retains the board against a rest. The invention does not provide a groove extending along and retaining two contiguous sides of the board, nor snaps retaining the sides of the board opposite the ingrooved sides. Further, the invention does not support an LCD panel. U.S. Pat. No. 3,922,051, to Reynolds, entitled Connector for Alphanumeric Display Panels, includes a connector arrangement for holding an LCD panel securely. The panel is urged into electrical connection with a plurality of terminals, guided by laterally-disposed shoulders on a housing. A wedge wedges between the housing and the end of the LCD panel opposite the electrical terminals. The invention relies on separate parts and does not insure that the LCD panel does not peel away from the housing. The invention also does not provide a housing that receives an edge of a printed circuit board for driving an LCD panel, the edge serving as a pivot for rotating the other edge into engagement with a snap extending from the housing. U.S. Pat. No. 4,111,533, to Nakamura et al., entitled Liquid Crystal Display Device, includes a U-shaped housing with an interior groove receiving a polarizer cassette, including an LCD panel. A casing mounts on the housing, capping the groove so that the cassette does not escape therefrom. The invention does not provide a housing that receives an edge of a printed circuit board for driving an LCD panel, the edge serving as a pivot for rotating the other edge into engagement with a snap extending from the housing. U.S. Pat. No. 4,950,072, to Honda, entitled Presentation Device for Overhead Projector, includes an overhead projector housing with a notch which receives a locking pawl of an LCD panel which serves as a pivot for rotating the other edge into engagement with a locking piece extending from the housing. The invention does not provide a housing that receives an edge of a printed circuit board for driving an LCD panel, the edge serving as a pivot for rotating the other edge into engagement with a snap extending from the housing. U.S. Pat. No. 5,134,548, to Turner, entitled Snap-In Liquid Crystal Display Backlight Assembly, includes a PC board with LCD mounting sockets which receive the pins of an LCD panel. The invention does not provide a housing that receives an edge of a printed circuit board for driving an LCD panel, the edge serving as a pivot for rotating the other edge into engagement with a snap extending from the housing. U.S. Pat. No. 5,594,573, to August, entitled Image Display Glasses Having an Lcd for Displaying an Image Wherein the Image Provides for Viewing by Others, includes a frame that defines two U-shaped supports, each with an interior groove receiving a lens assembly, each lens assembly including an LCD panel. A separate bottom portion engages with the frame and retains each lens into its respective groove. The invention relies on separate parts. The invention also does not provide a housing that receives an edge of a printed circuit board for driving an LCD panel, the edge serving as a pivot for rotating the other edge into engagement with a snap extending from the housing. U.S. Pat. No. 5,404,274, to Bond et al., entitled Assembly for Receiving and Retaining a Circuit Board Retainer, includes a housing defining a channel with an open lateral side, an aperture at one end and a narrow-throated throated slot at the other end. A retainer includes a first protrusion, received in the aperture, and a second protrusion, which snaps into and is retained in the slot. The invention relies on separate parts. The invention also does not provide a housing that receives an edge of a printed circuit board for driving an LCD panel, the edge serving as a pivot for rotating the other edge into engagement with a snap extending from the housing.

After careful consideration of the exemplars of contemporary practice in the art, I have found that the fabrication procedure for an LCD monitor using typical substrate coupling structure is time-consuming, which lowers productivity and increases manufacturing costs accordingly. Furthermore, the proper alignment of the substrate with the bosses is difficult due to tolerance problems with respect to the hole pattern and rear cover formation. In addition, the mere presence of the substrate holes weakens the substrate and places undue design limitations on a substrate, which may be in the form of a printed circuit board, in that circuit traces cannot be routed across a hole.

SUMMARY OF THE INVENTION

Accordingly, the present invention is directed to an improved substrate coupling structure and assembly method for a flat-panel display such as an LCD monitor that substantially obviates one or more of the problems, limitations and disadvantages of the related art.

It is an object of the present invention to provide an improved substrate coupling structure and assembly method for a flat-panel display such as an LCD monitor in which a substrate easily is coupled to the inside of the monitor body, with proper alignment and without using multiple assembly components such as screws.

Another object of the present invention is to provide a substrate coupling structure and assembly method that fastens the inclusion of a substrate without holes therein in a flat-panel display.

Additional features and advantages of the invention will be set forth in the description which follows, and in part will be apparent from the description, or may be learned through practice of the invention. The objectives and other advantages of the invention will be realized through the structure, particularly as pointed out in the written description and claims hereof, as well as the appended drawings.

To achieve these and other advantages, and in accordance with the purpose of the present invention as embodied and broadly described, there is disclosed a substrate coupling structure for a liquid crystal display monitor including a rear cover and a rectangular substrate coupled to the rear cover, including: a guide rib, formed on the inside surface of the rear cover, having a race for receiving two adjacent edges of the substrate; and a plurality of elastic snaps, formed on the rear cover opposite the guide rib, each having a catch for receiving the other two edges of the substrate. The guide rib and elastic snaps may be formed integrally as part of the rear cover.

It is to be understood that both the foregoing general description and the following detailed description are merely exemplary and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
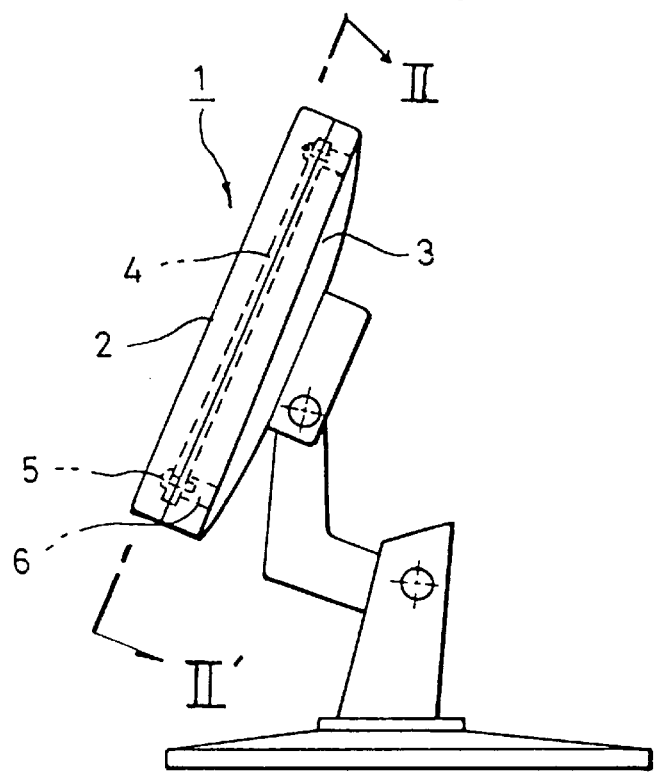
FIG. 1 is a right side elevational view of a flat-panel display such as an LCD monitor.
Figure 2:
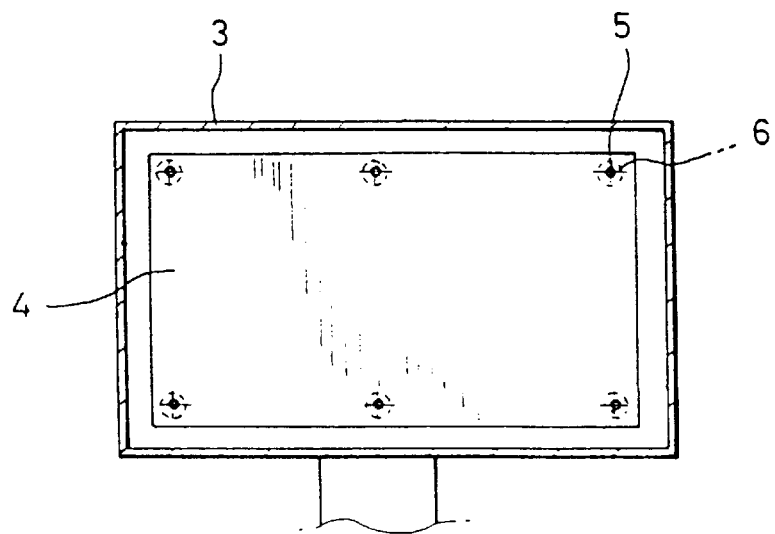
FIG. 2 is a cross-sectional detail view drawn along line II–II' of FIG. 1.

FIGS. 1 and 2 depict typical coupling structure of printed circuit board (hereinafter, "substrate"). A monitor body I is the combination of a front cover 2 and a rear cover 3 and has a substrate 4 installed therein, all of which substantially are rectangular in shape. The substrate 4 is coupled to the inside of the rear cover 3, using a plurality of screws 5 corresponding to bosses 6 which are respectively formed on the rear cover so as to coincide with a hole pattern in the substrate. To install the substrate 4, the holes therein are aligned with the bosses 6 and held in place while each screw 5 individually is inserted through the substrate holes and into the bosses 6.

Figure 3:
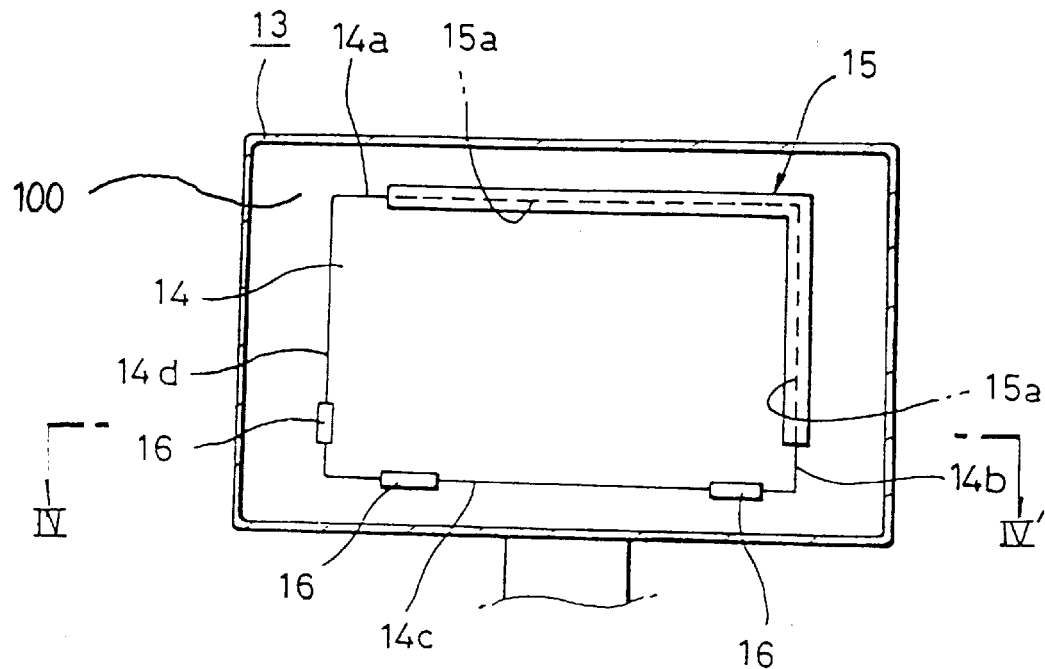
FIG. 3 is a front elevational view of a substrate coupling structure for an LCD monitor constructed in accordance with the principles of the present invention.
Figure 4:
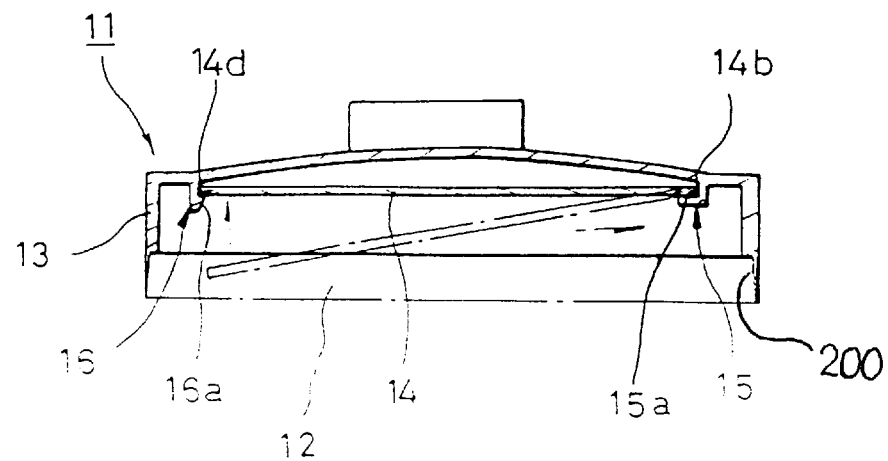
FIG. 4 is a cross-sectional detail view drawn along line IV–IV' of FIG. 3, showing substrate installation in accordance with the principles of the present invention.

Referring to FIGS. 3 and 4, the substrate coupling structure of the present invention is provided to the inside surface 100 of a rear cover 13 which will be joined with a front cover 12, shown in FIG. 4 only define a monitor body 11, as shown in FIG. 4 only. The rear cover 13 includes a guide rib 15 having a race 15a for receiving edges 14a and 14b of a substrate 14, and a plurality of elastic snaps 16, each having a catch 16a, shown in FIG. 4 only, for securing substrate edges 14c and 14d. As shown in FIG. 4 only, the guide rib 15 has an L-shaped cross section and the elastic snaps 16 are formed opposite the guide rib.

The rear cover 13 also has a recess or groove 200 configured to closely receive a flat-panel display such as a LCD panel (not shown) that provides variable images in response to reception of video signals. Cover 13 may urge the LCD panel (not shown) into the recess 200 and secure it therein.

To install the substrate (PCB) into an LCD monitor having a substrate coupling structure constructed according to the principle of the present invention, two adjacent substrate edges 14a and 14b first are seated in the race 15a of the guide rib i5, then the substrate's opposite edges 14c and 14d are pressed into the snaps 16. Here, the substrate 14 slides downward across the inner sides of the elastic snaps 16, pushing the snaps outward and allowing the substrate to "snap" into position when the snaps return to their original position as the catches 16a grab onto substrate edges 14c and 14d. Accordingly, the substrate 14 becomes coupled securely with the rear cover 13.

As described above, the substrate 14 is fitted into the inside of the rear cover 13, for simplified coupling without using screws, thus securely mounting the substrate in the monitor body 11 and enhancing production yield. The substrate coupling structure of the present invention uses a guide rib and elastic snaps, integrally formed with the monitor's rear cover by injection molding, and does not employ separate assembly components. Further, there is no alignment difficulty in the fabrication procedure of an LCD monitor using such a substrate coupling structure, since the tolerance problem with respect to a substrate hole pattern and rear cover formation is eliminated. In addition, the substrate can be formed free of any mounting holes.

It will be apparent to those skilled in the art that various modifications can be made in the PCB coupling structure for an LCD monitor according to the present invention, without departing from the spirit of the invention. Thus, it is intended that the present invention cover such modifications as well as variations thereof within the scope of the appended claims.

What is claimed is:

1. A substrate coupling structure for a flat panel display, including a rear cover and a rectangular substrate coupled to the rear cover, comprising:
   a guide rib, formed on the inside surface of the rear cover, having a race for receiving two adjacent edges of the substrate; and
   a plurality of elastic snaps, formed on the rear cover, opposite said guide rib, each having a catch for receiving the other edges of the substrate.

2. A substrate coupling structure according to claim 1, wherein the substrate is a printed circuit board.

3. A substrate coupling structure according to claim 1, wherein said guide rib is integrally formed with the rear cover.

4. A substrate coupling structure according to claim 1, wherein said plurality of elastic snaps are integrally formed with the rear cover.

5. A substrate coupling structure according to claim 1, wherein said plurality of elastic snaps numbers at least two.

6. A display apparatus, comprising:
   a housing, further comprising:
     a recess therein;
     a guiding rib extending therefrom, defining a race; and
     a snap extending therefrom;
   a flat-panel display received in said recess; and
   a circuit board, electrically connected to said a flat-panel display, further comprised of:
     a first side and a second side, each received in said race; and
     a third side and fourth side, one of said third side and said fourth side being engaged by said snap.

7. The display apparatus of claim 6, said snap further comprising a catch.

8. The display apparatus of claim 6, said snap being biased relative to said housing.

9. The display apparatus of claim 6, further comprising a second snap engaging the other of said third side or said fourth side.

10. The display apparatus of claim 6, further comprised of said first side being perpendicular to said second side.

11. The display apparatus of claim 10, further comprised of said third side being perpendicular to said fourth side.

12. The display apparatus of claim 6, further comprised of said first side being parallel with said third side.

13. The display apparatus of claim 12, further comprised of said second side being parallel with said fourth side.

14. A display apparatus, comprising:
   a housing, further comprising:
      a recess therein;
      a guiding rib extending therefrom, defining a race; and
      a snap extending therefrom, biased relative thereto, further comprising a catch;
   a flat-panel display received in said recess; and
   a circuit board, electrically connected to said a flat-panel display, further comprised of:
      a first side and a second side, said first side being perpendicular to said second side, each of said first side and said second side being received in said race; and
      a third side and fourth side, said third side being perpendicular to said fourth side, one of said third side or said fourth side being engaged by said snap.

15. The display apparatus of claim 14, further comprising a second snap engaging the other of said third side or said fourth side.

16. The display apparatus of claim 14, further comprised of said first side being parallel with said third side.

17. The display apparatus of claim 16, further comprised of said second side being parallel with said fourth side.

* * * * *